(12) United States Patent
Jacobsen et al.

(10) Patent No.: US 11,845,415 B2
(45) Date of Patent: Dec. 19, 2023

(54) AGV HAVING DYNAMIC SAFETY ZONE

(71) Applicant: MOBILE INDUSTRIAL ROBOTS A/S, Odense (DK)

(72) Inventors: Niels Jul Jacobsen, Odense (DK); Soeren Nielsen, Soenderborg (DK)

(73) Assignee: MOBILE INDUSTRIAL ROBOTS A/S, Odense Soe (DK)

( * ) Notice: Subject to any disclaimer, the term of this patent is extended or adjusted under 35 U.S.C. 154(b) by 338 days.

(21) Appl. No.: 17/275,736

(22) PCT Filed: Sep. 6, 2019

(86) PCT No.: PCT/EP2019/073819
§ 371 (c)(1),
(2) Date: Mar. 12, 2021

(87) PCT Pub. No.: WO2020/053088
PCT Pub. Date: Mar. 19, 2020

(65) Prior Publication Data
US 2022/0043452 A1 Feb. 10, 2022

(30) Foreign Application Priority Data
Sep. 13, 2018 (EP) .................................. 18194300

(51) Int. Cl.
*B60T 8/1755* (2006.01)
*B60T 7/22* (2006.01)
*B60T 8/17* (2006.01)

(52) U.S. Cl.
CPC ............ *B60T 8/17558* (2013.01); *B60T 7/22* (2013.01); *B60T 8/1701* (2013.01); *B60T 2201/022* (2013.01); *B60T 2250/02* (2013.01)

(58) Field of Classification Search
CPC ...... B60T 7/22; B60T 8/1701; B60T 8/17558; B60T 2201/022; B60T 2250/02
(Continued)

(56) References Cited

U.S. PATENT DOCUMENTS

| 5,983,161 A | 11/1999 | Lemelson et al. |
| 6,459,955 B1 | 10/2002 | Bartsch et al. |

(Continued)

FOREIGN PATENT DOCUMENTS

| CN | 101532934 A | * | 9/2009 |
| CN | 112744224 A | * | 5/2021 |

(Continued)

OTHER PUBLICATIONS

European Office Action dated Nov. 8, 2021, European App. No. 18194300.2 (5 pages).
(Continued)

*Primary Examiner* — Atul Trivedi
(74) *Attorney, Agent, or Firm* — Burns & Levinson LLP

(57) ABSTRACT

There is provided an automatically guided vehicle (AGV), which is configured to detect if a payload mass differs significantly from a preset payload mass towed and/or carried by the vehicle, and if a payload mass different from the preset payload is detected, the control system of the vehicle is automatically updated to adjust either: i) the speed of the vehicle based on preset safety brake distance information associated with the detected different payload mass; or ii) increase the safety zone or switch to a safer safety zone in order to avoid collision with any obstacles.

20 Claims, 6 Drawing Sheets

(58) Field of Classification Search
USPC .......................................................... 701/26
See application file for complete search history.

(56) References Cited

U.S. PATENT DOCUMENTS

| | | | |
|---|---|---|---|
| 9,606,544 | B2 | 3/2017 | Gariepy et al. |
| 9,663,025 | B2 | 5/2017 | Drexler et al. |
| 9,746,852 | B1 | 8/2017 | Watts et al. |
| 9,891,630 | B2 | 2/2018 | Gariepy et al. |
| 9,918,605 | B2 | 3/2018 | Wolfe et al. |
| 9,963,155 | B2 | 5/2018 | Gariepy et al. |
| 10,585,440 | B1 | 3/2020 | Gariepy et al. |
| 10,668,617 | B2 | 6/2020 | Jacobsen |
| D907,677 | S | 1/2021 | Mork et al. |
| 10,916,029 | B2 | 2/2021 | Kabel et al. |
| D929,478 | S | 8/2021 | Mork et al. |
| 2005/0206231 | A1* | 9/2005 | Lu .................... B60W 30/02 303/146 |
| 2005/0209762 | A1* | 9/2005 | Lu ....................... B60T 7/22 701/96 |
| 2011/0196623 | A1* | 8/2011 | Hakkinen .......... G01G 23/3728 702/41 |
| 2013/0085649 | A1* | 4/2013 | Matoy .................. B60T 8/1708 701/70 |
| 2014/0088761 | A1 | 3/2014 | Shamlian et al. |
| 2014/0110183 | A1 | 4/2014 | Rudakevych et al. |
| 2014/0278041 | A1* | 9/2014 | Brenninger ........... F16H 61/435 701/124 |
| 2015/0362921 | A1 | 12/2015 | Hanaoka et al. |
| 2016/0236347 | A1 | 8/2016 | Shikina et al. |
| 2016/0377508 | A1* | 12/2016 | Perrone ................ G01M 17/06 180/204 |
| 2017/0008085 | A1 | 1/2017 | Drexler et al. |
| 2017/0031366 | A1 | 2/2017 | Shamlian et al. |
| 2017/0038776 | A1 | 2/2017 | Gariepy et al. |
| 2017/0072558 | A1 | 3/2017 | Reynolds et al. |
| 2017/0080850 | A1 | 3/2017 | Drexler et al. |
| 2017/0182459 | A1 | 6/2017 | Klidas et al. |
| 2017/0197643 | A1 | 7/2017 | Gariepy et al. |
| 2017/0232885 | A1 | 8/2017 | Drexler et al. |
| 2017/0291315 | A1 | 10/2017 | Wise |
| 2017/0344009 | A1 | 11/2017 | Wernersbach |
| 2018/0075619 | A1 | 3/2018 | Kabel et al. |
| 2018/0281178 | A1 | 10/2018 | Jacobsen |
| 2019/0384314 | A1 | 12/2019 | Jacobsen |
| 2020/0004247 | A1 | 1/2020 | Jacobsen et al. |
| 2020/0108811 | A1* | 4/2020 | Wijffels ................. B60T 7/18 |
| 2020/0159238 | A1 | 5/2020 | Jacobsen et al. |
| 2021/0208592 | A1 | 7/2021 | Jacobsen |
| 2021/0223786 | A1 | 7/2021 | Jacobsen |
| 2023/0020966 | A1* | 1/2023 | Foster .................. G06V 20/582 |

FOREIGN PATENT DOCUMENTS

| | | |
|---|---|---|
| DE | 102017103097 A1 | 8/2018 |
| EP | 3167784 | 5/2017 |
| JP | H086640 B2 | 1/1996 |
| WO | 2013043969 A1 | 3/2013 |
| WO | 2016165721 | 10/2016 |
| WO | 2017004524 | 1/2017 |
| WO | 2017050358 A1 | 3/2017 |
| WO | 2018149789 A1 | 8/2018 |
| WO | WO-2020023660 A1 * | 1/2020 |
| WO | WO-2020023665 A1 * | 1/2020 |

OTHER PUBLICATIONS

International Search Report dated Nov. 11, 2019, International Application No. PCT/EP2019/073819 filed Sep. 6, 2019 (4 pages).
Written Opinion dated Nov. 11, 2019, International Application No. PCT/EP2019/073819 filed Sep. 6, 2019 (6 pages).
Action and Response History for U.S. Appl. No. 17/161,977 (dated Jul. 13, 2023), 39 pages.
Action and Response History for U.S. Appl. No. 16/009,414 (dated Jul. 19, 2023), 24 pages.
Action and Response History for U.S. Appl. No. 14/883,698 (dated Jul. 19, 2023), 49 pages.
AutomotiveDictionary.org, "Lateral Acceleration meaning," [online] URL: https://automotivedictionary.org/lateral_acceleration (visited Jul. 12, 2023), 3 pages.
Blizzard, Classic games, Warcraft: Orcs & Humans (1994). [Online] URL: http//us.blizzard.com/en-us/ games/legacy. [Last accessed Dec. 26, 2017], 1 page.
Dixon et al., Mobile Robot Navigation, Final Report, Imperial College, London, (Jun. 10, 1997). [Online]. URL: http://www.doc.ic.ac.uk/-nd/surprise_97/journal/vol4/jmd/. [Accessed Jun. 22, 2017], 27 pages.
DOS Games Archive, Warcraft 11: Tides of Darkness, (1995). [Retrieved Online Aug. 15, 2018]. URL: http//image.dosgamesarchive.com/screenshots/war2_06.png, 1 page.
Expomondo, EXPO 2000, Themenpark & Aubengelande, Deutschland, Holtmann International, (2000). [Online]. URL: http://expomondo.it/expo.html, 4 pages.
Ferzkopp.net, 2000. [Retrieved Online Aug. 15, 2018] URL: http//www.ferzkopp.net/MediaAndArt/Expo2000/ Softwaremodule.gif, 1 page.
MIR 100 User Guide, Mobile Industrial Robots, A/S. Odense, SO. (Nov. 2017). V. 1.0, (pp. 1-37). 39 pages.
MIR 100 User Guide. Mobile Industrial Robots A/S. Odense, SO. (Aug. 2018). V. 1.1, (pp. 1-42). 44 pages.
Mobile Industrial Robots, MiRFleet, Reference Guide, v.1.0, 32 pages (Jan. 2017).
Nedelea, A., "Hyundai's Future Augmented Reality Looks Pretty Cool," (Jan. 1, 2015). [Retrieved Online Aug. 15, 2018]. URL: http://www.carscoops.com/2015/01/hyundais-future-augmented-reality-looks/, 6 pages.
Russell, Roger, "roger-russell.com," 2004. [Online] URL: http://web.archive.org/web/20050404140115/http://www. roger-russell.com/project/project.htm. [Retrived Aug. 20, 2018], 11 pages.
Seat.com, "Lateral acceleration," [online] URL: https://www.seat.com/car-terms/l/lateral-acceleration#:~:text=Lateral%20acceleration%20acts%20transversely%20to,the%20outside%20of%20the%20bend. (visited Jul. 12, 2023), 1 page.
Shenton, Collectable Clocks, Illustration 306, Projection Clock/Night Clock (1909). [Online], URL: http://web. archive.org/web/20041012014240/http://www.mueller-maerki.com:80/h-niteclk.html. [Retrieved Aug. 20, 2018], 5 pages.
Wikipedia, "Understeer and Oversteer," [online] URL: https://en.wikipedia.org/w/index.php?title=Understeer_and_oversteer&oldid=1153254219 (Jul. 2023), 3 pages.
Zentrum fur Kunst und Medientechnologie (ZKM), Knowledge, Information, Communication Swarming with robots, EXPO 2000 HANNOVER GmbH (2000). [Online]. URL: http://site.expo2000.de/expo2000/englisch/themenpoark/ frame_wissen_e.html, 2 pages.
International Search Report for PCT/EP2019/065766, 4 pages (dated Sep. 23, 2019).
Written Opinion for PCT/EP2019/065766, 5 pages (dated Sep. 23, 2019).
Cire2047, Warcraft: Orcs and Humans—Human Campaign Gameplay—Part 01, 1994 (Jan. 21, 2009). [Online]. URL: https://www.youtube.com/watch?y=UnGOuSWs10. [Last accessed Dec. 26, 2017].
Lucas Film, Star Wars: New Hope (1977). [Online]. URL: http://www.tbs.com/star-wars-a-new-hope. See times: (00:05:07); (00:04:43); (00:33:34).
Lucas Film, Star Wars: The Phantom Menace (1999). [Online]. URL: http://www.tbs.com/movies/star-wars-the- phantom-menace. See times: (00:6:32); (00:06:37); (00:49:39); (00:52:33); (01:13:04).
Mobile Industrial Robots A/S, MiR100 Elos Interview (Nov. 25, 2014). [Online]. URL: http://www.youtube. com/watch?v=CVqXXuVPvs.
Mobile Industrial Robots A/S, MiR100 Scan Case (English), (Jul. 1, 2015). [Online]. URL: http://www.youtube. com/watch?v=ogmGsjlimdg.
Mobile Industrial Robots A/S, MiR100 Wagon Driving (Dec. 9, 2014). [Online]. URL: http://www.youtube. com/watch?v=jGPBTERoeiO. [Last accessed on Dec. 28, 2017].

(56) References Cited

OTHER PUBLICATIONS

Mobile Industrial Robots A/S, MiR100 Wagon Parking (Dec. 9, 2014). [Online]. URL: http://www.youtube. com/watch?v=A4Vy8HrHoRw. [Last accessed on Dec. 26, 2017].

MovieClips, Steven Spielberg, Close Encounters of the Third Kind (2/8) Movie CLIP—Chasing the UFOs (1977) HD (Oct. 7, 2012). [Online]. URL: http://www.youtube.com/watch?v=8MW3KJUa8FQ.

MovieClips, Steven Spielberg, Close Encounters of the Third Kind (6/8) Movie CLIP—Communicating with the Mothership (1977) HD (Oct. 7, 2012). [Online]. URL: http://www.youtube.com/watch?v=S4PYl6TzqYk.

Omron Adept Technologies Inc, Introducing the Omron LD Mobile Robot (formerly Adept Lynx), (Dec. 19, 2014). [Online]. URL: http://www.youtube.com/watch?v=ZUr6-nFtR18.

Russell, Roger, "roger-russell.com," 2004. [Online] URL: http://web.archive.org/web/20050404140115/http:1/www. roger-russell.com/project/project.htm. [Retrieved Aug. 20, 2018], 11 pages.

SpaceX, Falcon 9 First Stage Reentry Footage from Plane (Aug. 14, 2014). [Online]. URL: http://www.youtube. com/watch?v=ullu7szab51. [Last accessed on Dec. 26, 2017].

Zentrum fur Kunst and Medientechnologie (ZKM), Knowledge, Information, Communication Swarming with robots, Expo 2000 Hannover GmbH (2000). [Online]. URL: http://site.expo2000.de/expo2000/englisch/themenpoark/frame_wissen_e.html, 2 pages.

\* cited by examiner

AGV HAVING DYNAMIC SAFETY ZONE

This application is a U.S. national stage entry of PCT application no. PCT/EP2019/073819 which was filed on Sep. 6, 2019. PCT application no. PCT/EP2019/073819 claims priority to European application no. 18194300.2 which was filed on Sep. 13, 2018. This application claims priority to both PCT application no. PCT/EP2019/073819 and to European application no. 18194300.2. Both PCT application no. PCT/EP2019/073819 and European application no. 18194300.2 are incorporated into this this application by reference.

FIELD OF THE INVENTION

The present invention relates to an AGV having dynamic safety zone based on the payload carried or towed by the vehicle. More specifically, the invention relates to a way of determining and promoting safety of a robotic payload.

BACKGROUND OF THE INVENTION

For autonomous (guided) vehicles (AGV), i.e. mobile driverless robots, there is a problem that the braking distances of the robots in motion are often incorrect and not reflecting the true braking distance. The braking distance used in the computer software that monitors and calculates if the vehicle is on collision course towards obstacles is often a value only depending on robot speed or static figures not reflecting the actual state of the vehicle and hence the actual braking distance. The incorrect braking distances used in the calculations results in either a risk of collision or an autonomous vehicle that drives too slow compared to what is possible while still operating safely.

In some robots the braking distance is not continuously calculated but instead a safety system continuously monitors i) the driving speed from motor/wheel encoder input, and ii) obstacle distance from scanner or other sensor input. Based on the driving speed a physical safety zone around the robot is defined and continuously evaluated from the scanner/sensor input if there are obstacles inside the safety zone and when this is the case then reduce speed by motor control or apply a braking mechanism to avoid collision. In such a system the incorrect braking distances will also result in either collision or unnecessary braking or reduction of speed.

Automated guided vehicles (AGV) may be used to transport payloads along a predetermined route without real-time human assistance. For example, an AGV can transport items such as heavy vehicle components like engines, chassis, etc. along a route on a manufacturing plant floor to deliver the payload from one location to another to allow various manufacturing operations to be performed thereon. Typical plant floors or other surfaces upon which AGVs operate may include irregularities that do not affect their normal operation as they travel from one location to another. For example, some AGVs may include shock absorbing or similar systems to allow the AGV to traverse irregular surfaces without disturbing the payload.

Meanwhile, when adding a cart/trolley to be towed by a robot the braking distances are increased. Mobile Robots are equipped with safety zones. When an object is visible inside the safety zone the robot safety system activates and stop the robot before collision with the object. Hence the safety zone must always be larger than the braking distance. The safety system is normally configured to change size of safety zone depending on velocity. Robots do not change safety zones based on attachment of cart.

US20170291315 discloses sensors for detecting payload and adjusting the robots velocity etc but it does not envisage changing safety zones.

SUMMARY OF THE INVENTION

The above mentioned problem associated with the prior art solutions has been solved by the present invention by mounting on the AGV (designed to tow a cart) a proximity sensor or mechanical switch to gripper or bottom of a cart for detection of when a cart is attached or when there is mass in the cart. This sensor input is used for adjusting the safety zones of the robot in order to match the changed brake distances.

In an alternative embodiment of the present invention a payload of robot is detected by means of a sensor and/or a load cell and is used to adjust the safety zones depending on impact on brake distances.

Thus, the solution to the problem is to take dynamic inputs from the vehicle that can be used to determine the braking distance more accurately and adjust the safety zones or values used for calculating the braking distance or collision check.

Accordingly, the present invention provides automatically guided vehicle (AGV) comprising drive wheels; a robot body mounted on said drive wheels; and optionally a cart attaching mechanism mounted on said robot body for coupling the cart to said vehicle. A scanner or sensor is provided for the detection of any obstacles inside a safety zone of the path pursued by the vehicle, and a control system is used for navigation and receiving information from the scanner or sensor with respect to obstacles. Importantly, the control system is not necessarily confined to a single system but may be composed by multiple sub-systems, each performing specific tasks, yet coordinated between the multiple sub-systems, e.g. a security system as one sub-control systems with another sub-system controlling navigation and speed of the robot.

The control system configured to dynamically set safety brake distances for the vehicle based on payload mass, including payload mass placed either on the vehicle or payload mass being towed, such as in a cart, by the vehicle. In that respect the vehicle is configured to detect if a payload mass differs significantly from a preset payload mass towed and/or carried by the vehicle, the preset payload mass corresponds to a preset safety brake distance, and if a payload mass different from the preset payload is detected, the control system is automatically updated to adjust:
- the speed of the vehicle based on preset safety brake distance information associated with the detected different payload mass; and/or
- increase the safety zone or switch to a safer safety zone in order to avoid collision with any obstacles.

Further, the AGV may include a cart attaching mechanism mounted on said robot body for coupling the cart to said vehicle; and optionally a proximity sensor mounted on the robot body for detecting if a cart is towed by the vehicle.

DETAILED DESCRIPTION OF THE INVENTION

One aspect of the invention solves the problem of different braking distances with or without the vehicle towing a cart/trailer. This is achieved by utilizing a sensor, which detects if a cart is attached or not. The sensor can be a simple proximity sensor which uses light (IR, laser or similar), capacitance, inductance or mechanical movement (switch). When the sensor indicates that a cart is attached the safety zones are changed to other preset values that reflect the larger braking distance or the values used for calculating the braking distance or check the collision is changed.

Another aspect of the invention solves the problem of higher braking distances when the vehicle has a heavy payload. This is achieved by utilizing a load sensor in the payload area of the vehicle or on the wheel suspension area, which detects the mass of the payload or total mass of the vehicle. The load values can then be used for selecting different safety zones from a number of different tables of braking distance for different speeds or be calculated via Newtonian rules, each table representing a different payload range. Alternatively the payload figure can be used for selecting different values for calculating the braking distance or check the collision. A variant of the method is to have more than one payload sensor and from these inputs determine the gravitational centre and the total payload and use these values for selecting the safety zones or calculating the braking distance or the collision check.

The third aspect is to decide the payload, towing mass and braking distance from an acceleration and deceleration test. At various intervals, i.e. after every stop of a certain duration or similar, the robot will start driving with a known predetermined motor torque and from the motor/wheel encoder input it can calculate the acceleration of the vehicle. After a small acceleration the vehicle can apply a predetermined period of braking or free running and from the encoder input in this period calculate the deceleration. From the acceleration and deceleration figures the inclination/declination of the ground can be determined and based on this information the braking payload, towing mass, and braking distance can be calculated by the robot software.

Referring to FIG. 1A-1D there are shown flow diagrams, which reflect the steps carried out by the controller of the AGV in three alternative modes.

Figure 1A:
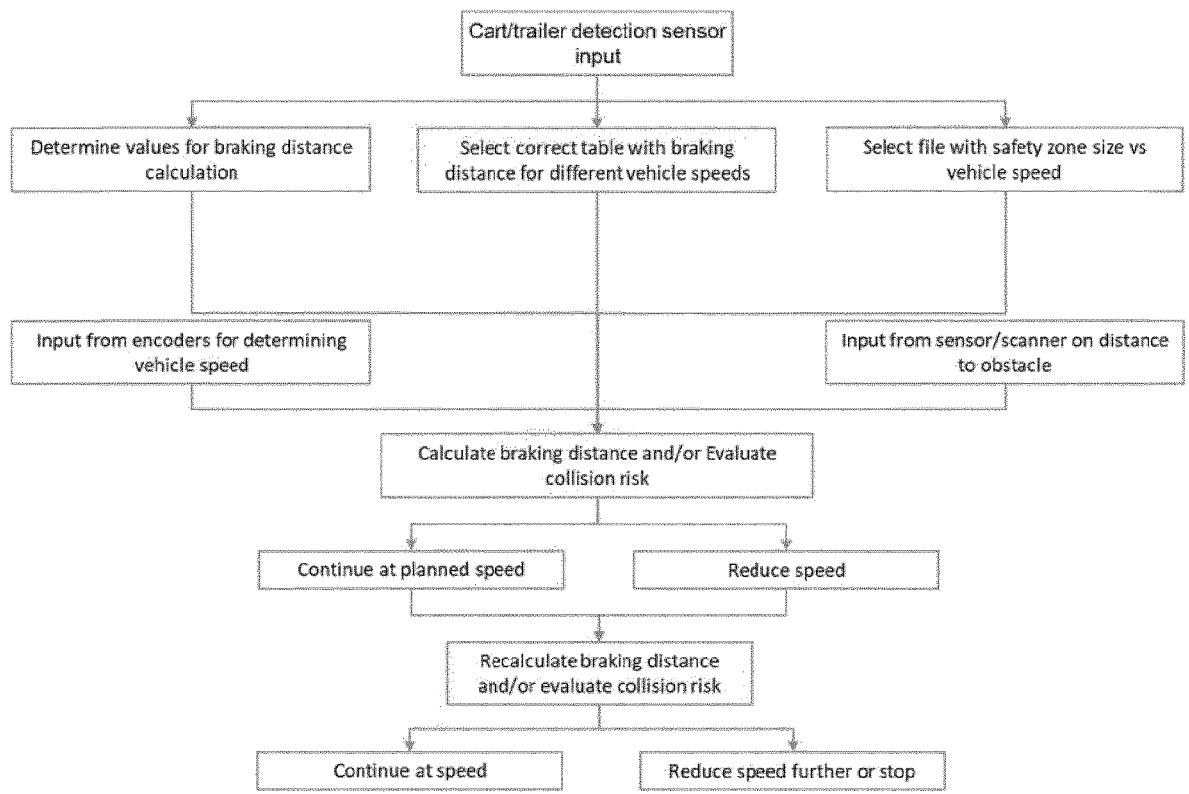
FIGS. 1A-1D show a flow diagram of the steps performed by the AGV in order to dynamically change its safety zones in response to any obstacles.

In accordance with FIG. 1A there is provided a solution to the problem of different braking distances with or without the vehicle towing a cart/trailer is to have a sensor which detects if a cart is attached or not. The sensor can be a simple proximity sensor which uses light (IR, laser or similar), capacitance, inductance or mechanical movement (switch). When the sensor indicates that a cart is attached the safety zones are increased to other preset values that reflect the larger braking distance or the values used for calculating the braking distance or check the collision is changed.

Figure 1B:
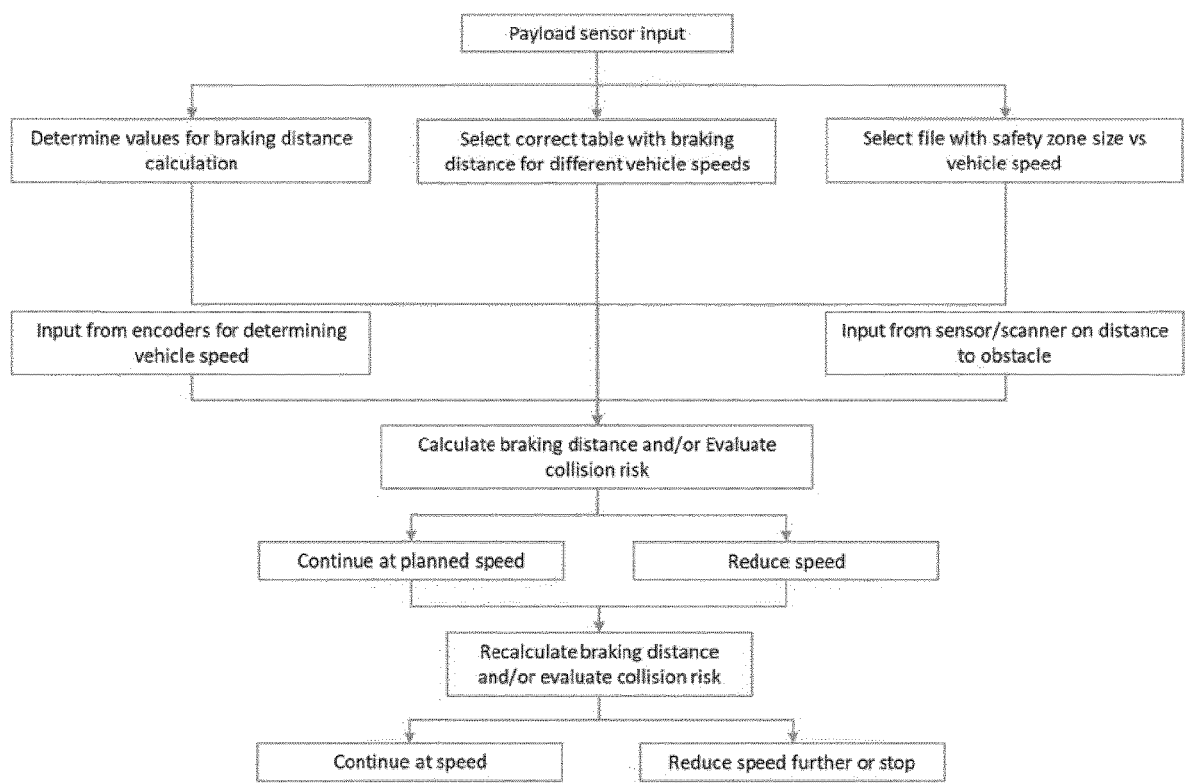

As shown in FIG. 1B the problem of higher braking distances when the vehicle has a heavy payload is solved by having a load sensor in the payload area of the vehicle or on the wheel suspension area which detects the mass of the payload or total mass of the vehicle. The load values can then be used for selecting different safety zones. Alternatively the payload figure can be used for selecting different values for calculating the braking distance or check the collision. A variant of the method is to have more than one payload sensor and from these inputs determine the gravitational centre and the total payload and use these values for selecting the safety zones or calculating the braking distance or the collision check.

Figure 1C:
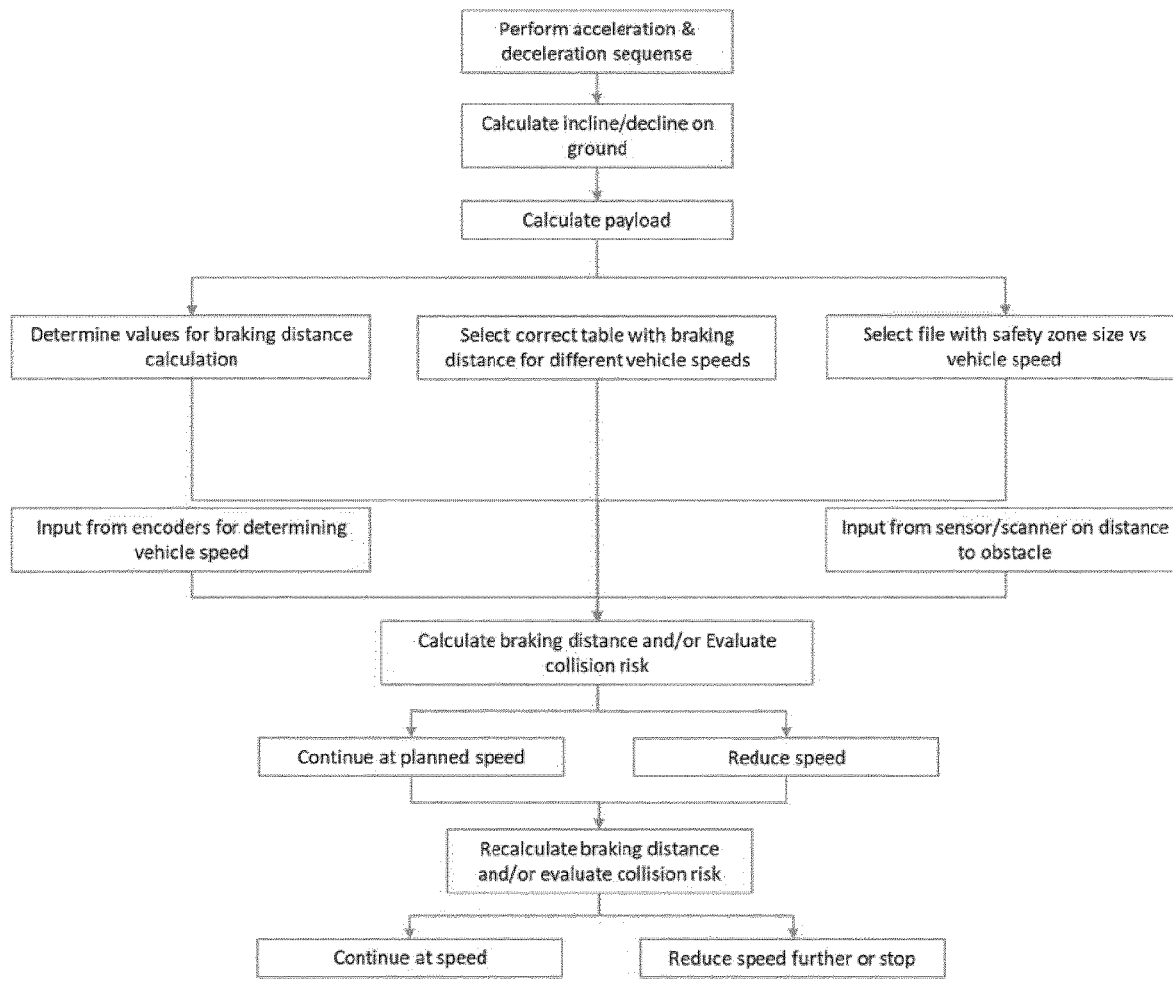
Figure 1D:
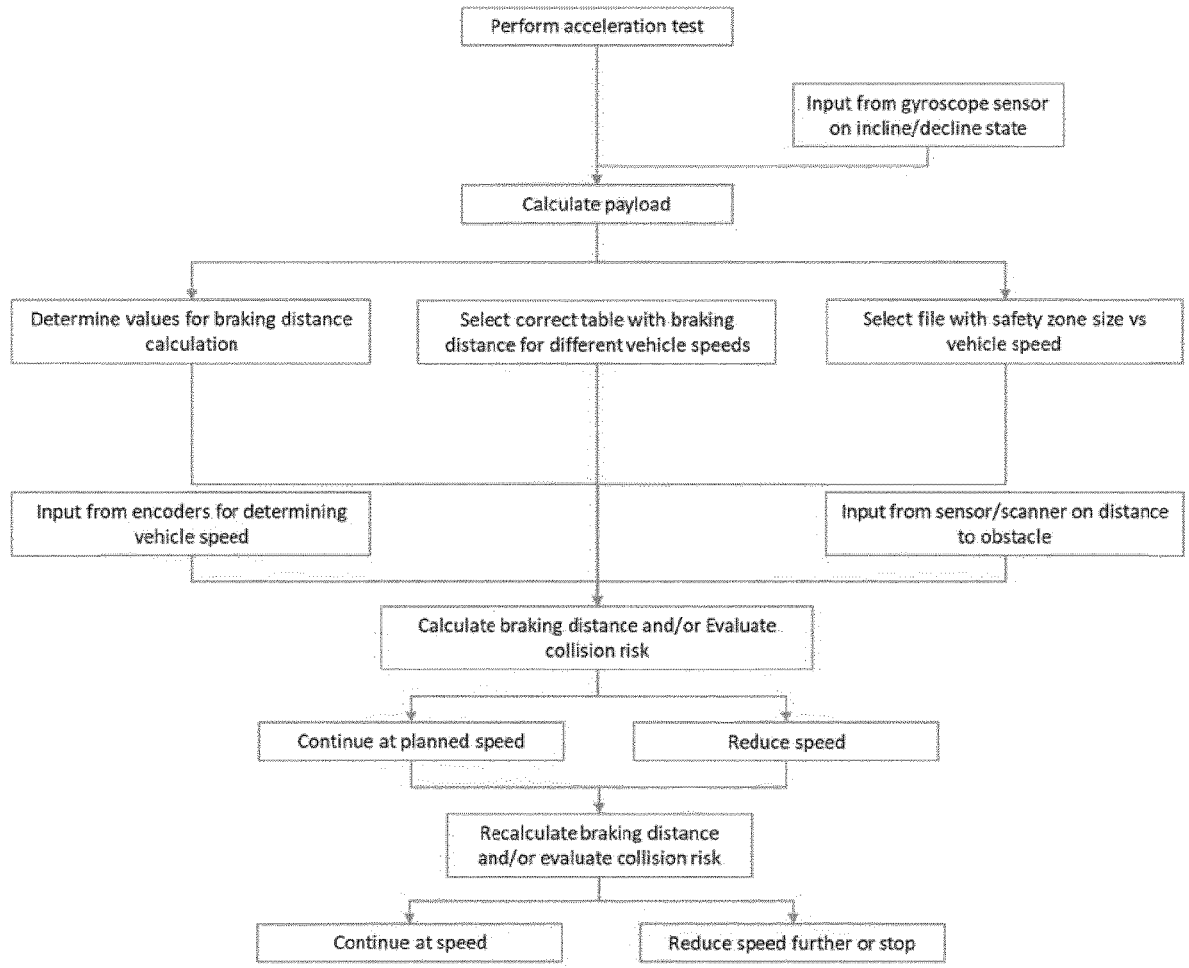

In FIG. 1C, which constitute the third alternative, is to decide the payload or towing mass from an acceleration and deceleration test. At various intervals, i.e after every stop of a certain duration or similar, the robot will start driving with a known predetermined motor torque and from the motor/wheel encoder input it can calculate the acceleration of the vehicle. After a small acceleration the vehicle can apply a predetermined period of braking or free running and from the encoder input in this period calculate the deceleration. From the acceleration and deceleration figures the inclide/declide of the ground can be determined as well as the payload or towing mass.

Figure 2A:
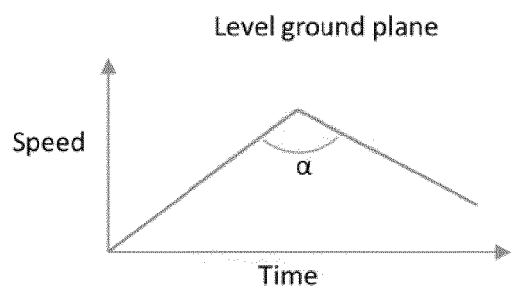
FIGS. 2A-2C show the principles of calculating ground level inclination or declination.
Figure 2B:
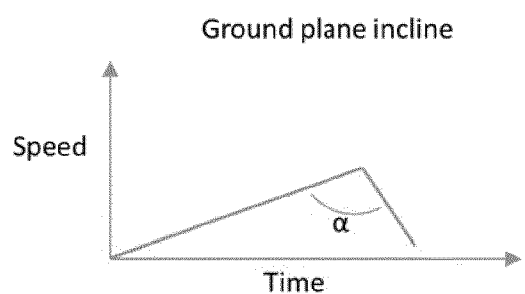
Figure 2C:
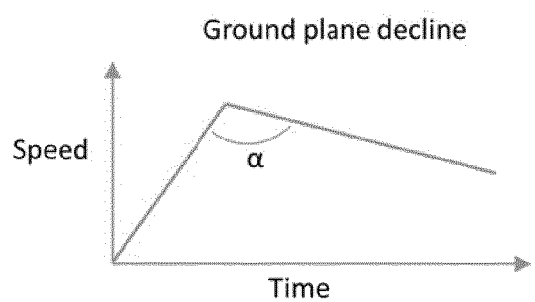

The ground level inclination or declination can be calculated by performing an acceleration and a deceleration of the robot with known forces. By performing both an acceleration test followed immediately be a deceleration period of either free running or known braking force the levelness of the ground plane can be calculated, see FIGS. 2A-2C. The ratio between acceleration and deceleration visualized by the angle alpha is proportional to the inertia and thereby the mass of the robot including payload and/or attached cart. Hence by calculating alpha and determine for a given system the relationship between alpha and total mass the mass can be calculated from the acceleration and deceleration data.

An alternative to making both acceleration and deceleration tests is to only perform an acceleration test and combine this with data from a gyroscope sensor.

Figure 3:
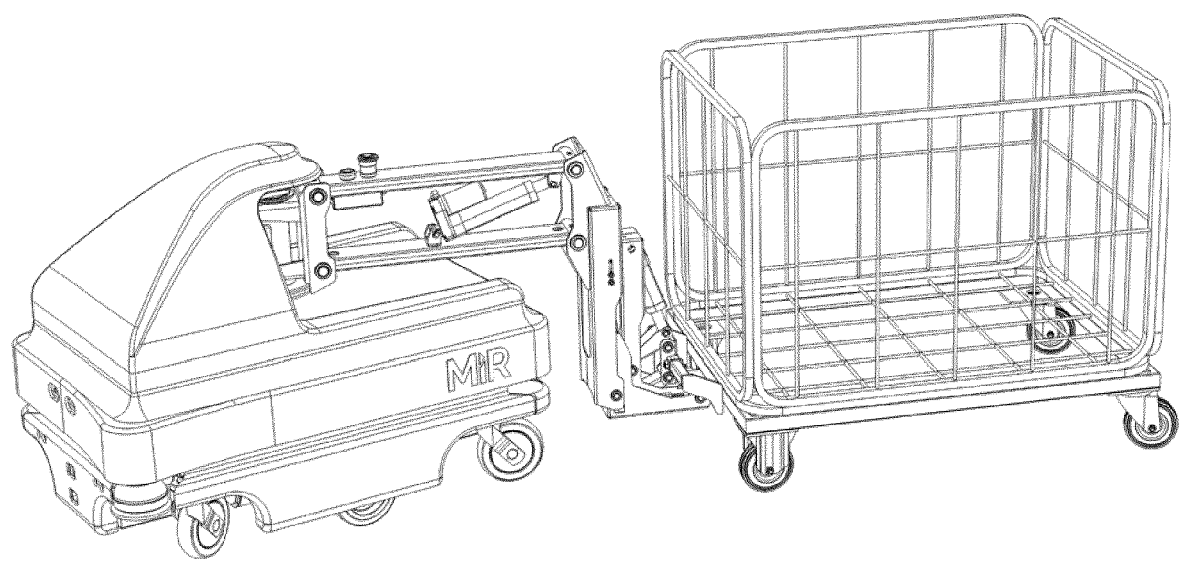
FIG. 3 shows an embodiment of the AGV towing a trailer.

Referring to FIG. 3 there is shown a cart attached to the robot. The cart attaching mechanism has automatically made a coupling with the cart and transports it to a destination. In FIG. 2 the automatically guided vehicle is used for towing (or pushing) a wheeled cart having at least four wheels and provided with a cart frame, the vehicle comprising drive wheels; a robot body mounted on said drive wheels; a control system utilizing a navigational system; a cart attaching mechanism mounted on said robot body for coupling the cart to said vehicle; at least one proximity sensor mounted on the robot body, said control system coupled to said at least one proximity sensor for adjusting the calculated robotic position and detecting any obstacles. The cart attaching mechanism includes a trailer arm that is freely rotatable in a horizontal plane, said arm mounted in a pivot point on the robot body in one end and provided with a gripping portion in the other end for gripping and holding the cart to be towed. A proximity sensor placed on the rear side of the AGV may detect whether or not a cart is attached. A load detector placed below the cart may measure the load carried and transfer this information to the controller of the AGV to dynamically adjust the safety zones of the robot in order to match the increased brake distances.

The mobile robot of the present invention includes a chassis, a drive system disposed on the chassis and configured to maneuver the robot over a work surface. It may further comprises a control system connected to the drive system. Furthermore, the robot (AGV) may have a deck system including a payload deck configured to receive a removable payload.

For the sake of completeness it is noted that the present disclosure uses the term automatically guided vehicle (AGV) for any mobile robot having a navigation system, which may be guided by e.g. vision, magnets, geoguidance, gyroscope, and lasers. It is therefore understood that the term also comprises Autonomous Mobile Robots (AMR).

The invention claimed is:

1. An automatically guided vehicle (AGV) comprising:
   wheels;
   a robot body mounted on the wheels;
   a scanner or sensor to detect an obstacle inside a safety zone of the AGV, the safety zone being a region around the AGV; and
   a control system configured to:
      receive information from the scanner or sensor relating to the obstacle;
      calculate a payload or towing mass of the AGV based on (i) forward acceleration of the AGV from a stopped state and (ii) an incline or a decline of ground under the AGV;
      dynamically set a safety brake distance for the AGV based on the payload or towing mass;
      detect whether the payload or towing mass has changed; and
      if the payload or towing mass has changed, automatically adjust a size of the safety zone in order to avoid collision with the obstacle.

2. The AGV of claim 1, wherein the control system comprises multiple sub-control systems.

3. The AGV of claim 2, further comprising:
   a cart attaching mechanism mounted to the robot body for coupling a cart to the vehicle.

4. The AGV of claim 3, wherein the control system is configured to receive the size of the safety zone, the size of the safety zone being received from user input or from system storage.

5. The AGV of claim 4, wherein the size of the safety zone is based on the payload or towing mass determined using at least one of an acceleration test or a deceleration test.

6. The AGV of claim 5, wherein the control system is configured to implement at least one of the acceleration test or the deceleration test by performing operations comprising at least one of:
   accelerating the AGV to drive at a predetermined motor torque and determining an acceleration of the AGV based on input from an encoder associated with a motor or a wheel of the AGV; or
   braking for a predetermined period of time or operating the AGV absent braking to determine deceleration.

7. The AGV of claim 6, further comprising:
   a proximity sensor on the robot body, the proximity sensor for detecting whether a cart is attached to the AGV or whether additional payload has been loaded onto the AGV.

8. The AGV of claim 7, wherein the proximity sensor is configured to perform detection based on light, capacitance, inductance, or mechanical movement.

9. The AGV of claim 8, further comprising:
   a mass sensor to detect the payload or towing mass.

10. The AGV of claim 9, wherein the mass sensor comprises one of a load cell, a scale, or a balance for weighing the payload or towing mass.

11. The AGV of claim 1, further comprising:
    a cart attaching mechanism mounted to the robot body for coupling a cart to the vehicle.

12. The AGV of claim 1 wherein the control system is configured to receive the size of the safety zone, the size of the safety zone being received from user input or from system storage.

13. The AGV of claim 1, wherein the size of the safety zone is based on the payload or towing mass determined using at least one of an acceleration test or a deceleration test.

14. The AGV of claim 13, wherein the control system is configured to implement at least one of the acceleration test or the deceleration test by performing operations comprising at least one of:
    accelerating the AGV to drive at a predetermined motor torque and determining an acceleration of the AGV based on input from an encoder associated with a motor or a wheel of the AGV; or
    braking for a predetermined period of time or operating the AGV absent braking to determine deceleration.

15. The AGV of claim 1, further comprising:
    a proximity sensor on the robot body, the proximity sensor for detecting whether a cart is attached to the AGV or whether additional payload has been loaded onto the AGV.

16. The AGV of claim 15, wherein the proximity sensor is configured to perform detection based on light, capacitance, inductance, or mechanical movement.

17. The AGV of claim 1, further comprising:
    a mass sensor to detect the payload or towing mass.

18. The AGV of claim 17, wherein the mass sensor comprises one of a load cell, a scale, or a balance for weighing the payload or towing mass.

19. A method of controlling an automatically guided vehicle (AGV), the method comprising:
    receiving information from a scanner or sensor relating to an obstacle inside a safety zone of the AGV, the safety zone being a region around the AGV;
    determining a payload or towing mass of the AGV based on (i) forward acceleration of the AGV from a stopped state and (ii) an incline or a decline of ground under the AGV;
    dynamically setting a safety brake distance for the AGV based on the payload or towing mass;
    detecting whether the payload or towing mass has changed; and
    if the payload or towing mass has changed, automatically adjusting a size of the safety zone in order to avoid collision with the obstacle.

20. An automatically guided vehicle (AGV) comprising:
    a body;
    wheels attached to the body; and
    a controller configured to perform operations comprising:
       receiving information from a scanner or sensor relating to an obstacle inside a safety zone of the AGV, the safety zone being a region around the AGV;
       determining a payload or towing mass of the AGV based on (i) forward acceleration of the AGV from a stopped state and (ii) an incline or a decline of ground under the AGV;
       detecting whether the payload or towing mass has changed; and
       if the payload or towing mass has changed, automatically adjusting a size of the safety zone in order to avoid collision with the obstacle.

* * * * *